UNITED STATES PATENT OFFICE.

BRUNO A. HOEHL, OF WHEELING, WEST VIRGINIA.

PRESERVED MALT PREPARATION.

1,381,833.      Specification of Letters Patent.    Patented June 14, 1921.

No Drawing.     Application filed April 3, 1920. Serial No. 371,110.

*To all whom it may concern:*

Be it known that I, BRUNO A. HOEHL, citizen of the United States, residing at Wheeling, in the county of Ohio and State of West Virginia, have invented new and useful Improvements in Preserved Malt Preparations, of which the following is a specification.

The present invention relates to putting up malt and hops in such a way as to render the same stable and to prevent deterioration.

It is well known that when malt is crushed or ground, the material known as malt flour, malt meal, etc., is particularly attractive to certain varieties of worms, and in accordance with the present invention the ravages of these worms are entirely prevented, and the malt is put up into the form in which it is to be eventually employed, and is thereby entirely preserved.

It is also well known that hop flowers deteriorate considerably when kept for long periods and the present invention seeks to overcome the said disadvantages in an effective manner so that the hops can be kept for long periods of time preferably in association with the malt which is to be employed therewith in the subsequent preparation of malt extracts, and the like.

In the manufacture of hopped malt extract, the best results can only be secured if the active principles of the malt and the active principles of the hops are present in the best proportions and if either the malt or the hops has previously been subjected to such conditions that deterioration has taken place therein, then the maker of the hopped malt extract must, in order to secure the best results, depart from the proportions usually followed, and such procedure is objectionable, since it would mean that each batch of hopped malt extract must be made up separately, the hops and the malt must be first carefully analyzed or tested and a great deal of unnecessary time and labor expended to produce the desired results.

In accordance with the present invention, a large quantity of malt may be first sampled and the sample analyzed and a large quantity of hops may likewise be first sampled and the sample tested to show that these materials are both of the standard quality, and then the mixtures can be made up and can be kept for long periods of time without any deterioration taking place, since the procedure as described below preserves both the malt and hops in their original condition.

In the making of hopped malt extracts, it is usual to employ other carbohydrate materials, for example, maltose syrup or other carbohydrate solutions, these preferably in the present invention, being used in the form of relatively thick or concentrated syrups or heavy solutions. Malt syrup is particularly advisable since the same does not readily dry out even if exposed to the air for considerable periods. However, it is advisable for the purpose of preventing the growth of molds and other fungi, to put up the material in the form of air-tight closed packages, tin cans having friction tops and similar receptacles capable of being closed in an air-tight manner being found entirely suitable.

In accordance with the preferred form of the present invention, the hops and malt (after each has been tested to show it to be of the standard quality) are comminuted to any desired extent, the hops may be run through a chopping mill and the malt in a dry state may be run through a crushing mill to produce malt meal, and the desired quantity of the hops and the desired quantity of the malt is then added to a concentrated syrup or other carbohydrate solution of the character above referred to, preferably just below the boiling point and the mass then run through a suitable mixing machine of any type which will produce a substantially complete mixing of the hops and malt with the syrup. In this manner, if particles of hops and if particles of the malt are coated with a film of the thick viscous carbohydrate solution, which prevents access of the worms, it also prevents access of air to the solid materials and hence preserves these materials in their original condition.

The mixture may then be filled into suitable cans or receptacles which are then closed in the well known manner and may be sterilized in any desired form of sterilizing apparatus.

This produces a mixture containing all of the necessary ingredients for the preparation of the hopped malt extract in a single operation, although, of course, it is to be understood that at the time of making the extract, any desired other substances may be added, such as materials capable of giving any desired flavor or taste. The product put up in this manner will keep for a practically indefinite period and without the objectionable deterioration to which the separate ingredients, hops and malt meal, are both subject.

Without limiting myself to specific proportions, the following example of the present invention is given for the purpose of illustration:

Dry malt meal or flour___26 parts,
Hop flowers, shredded____22 "
Malt syrup (gravity about
  1.4)_____32 "

I claim:

1. As a new product, a stable mixture comprising hops and malt and a syrup of saccharine liquid.

2. As a new article of manufacture, a sealed stable mixture comprising comminuted hops and comminuted malt, in a syrupy liquid containing dissolved carbohydrate substances.

In testimony whereof I affix my signature.

BRUNO A. HOEHL.